United States Patent
Lugo et al.

(10) Patent No.: US 8,714,879 B1
(45) Date of Patent: May 6, 2014

(54) METHOD OF FORMING A FIELD JOINT FOR A SUBSEA PIPELINE AND A METHOD OF LAYING AND POSITIONING SUCH SUBSEA PIPELINE

(75) Inventors: Mario R. Lugo, Houston, TX (US); Jan Garmulewicz, Houston, TX (US)

(73) Assignee: Trendsetter Engineering, Inc., Houston, TX (US)

( * ) Notice: Subject to any disclaimer, the term of this patent is extended or adjusted under 35 U.S.C. 154(b) by 237 days.

(21) Appl. No.: 13/218,762

(22) Filed: Aug. 26, 2011

(51) Int. Cl.
*F16L 1/26* (2006.01)
(52) U.S. Cl.
USPC .......................................... 405/170; 428/117
(58) Field of Classification Search
USPC ..................... 405/169, 170; 428/73, 116–118
See application file for complete search history.

(56) References Cited

U.S. PATENT DOCUMENTS

| | | | |
|---|---|---|---|
| 3,690,111 A | 9/1972 | Matthews, Jr. | |
| 4,120,167 A | 10/1978 | Denman et al. | |
| 4,124,991 A | 11/1978 | Adler | |
| 4,226,444 A | 10/1980 | Bunyan | |
| 4,714,623 A * | 12/1987 | Riccio et al. | 427/475 |
| 5,328,648 A | 7/1994 | McBrien et al. | |
| 5,830,548 A * | 11/1998 | Andersen et al. | 428/36.4 |
| 6,058,979 A | 5/2000 | Watkins | |
| 6,641,330 B1 | 11/2003 | Andersen et al. | |
| 6,739,803 B2 | 5/2004 | Bass et al. | |
| 8,074,720 B2 * | 12/2011 | Radi | 166/350 |

* cited by examiner

*Primary Examiner* — Tara M. Pinnock
(74) *Attorney, Agent, or Firm* — Egbert Law Offices, PLLC

(57) ABSTRACT

A method of forming a field joint for a subsea pipeline includes the steps of positioning an end of a first pipe adjacent to an end of a second pipe, welding the end of the first pipe to an end of the second pipe, and applying a coating material over an exterior surface of the first pipe, over the welding, and over an exterior surface of second pipe such that the coating material is in sealing relationship therewith. The coating material has air-filled glass spheres therein. A mold is placed over the adjacent pipe sections and the coating material is injected under pressure into the mold.

13 Claims, 4 Drawing Sheets

METHOD OF FORMING A FIELD JOINT FOR A SUBSEA PIPELINE AND A METHOD OF LAYING AND POSITIONING SUCH SUBSEA PIPELINE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to methods and apparatus for forming a subsea pipeline. More particularly, the present invention relates to methods for forming a joint in a subsea pipeline. Additionally, the present invention relates to methods of laying and positioning the subsea pipeline.

2. Description of Related Art Including Information Disclosed Under 37 CFR 1.97 and 37 CFR 1.98

Offshore pipelines have normally been laid on the seabed by using a pipe laying barge. Pipe sections, typically 40 feet long, are welded to the end of the assembled pipeline on the barge and the pipe is launched over the stern of the barge as the vessel moves forward.

The part of the pipe between the vessel and the seabed adopts an S-shaped configuration or a J-shaped configuration having an upper curve called an "overbend" and a lower curve called a "sagbend". It is important to ensure that there is not excess curvature in the overbend and the sagbend, or else the resulting high stress in the pipe can cause ovalization, buckling or fracture. Such buckles can be extremely expensive to repair. Typically, a supporting structure is employed to support the pipe in the overbend region so as to prevent excess curvature. Stingers are well known for this purpose and typically employ a buoyant structure for supporting the pipe. However, instead of a buoyant stringer, a fixed and rigid stern ramp is also known for supporting the pipe in the overbend. Such a stern ramp comprises a rigid structure extending from the stern of the pipe laying barge and remains fixed during pipe laying operations. The ramp is fitted with rollers along its length late which are positioned along an arcuate path for supporting pipe launched from the barge as it curves downwardly into the water in the overbend.

During these normal pipe laying operations, fresh pipe sections are welded to the end of the assembled pipeline on the barge, with the barge remaining stationary relative to the seabed, and similarly, the assembled pipe remaining stationary relative to the barge. When a fresh pipe length has been welded on and the joint finished as required, a length of pipe corresponding to the freshly added-on length is launched from the barge by moving the barge forward under the pipe and allowing the pipe to slide off the stern of the barge over the stern ramp or stinger.

During such pipe laying operations, it is very important to determine the touchdown point of the pipeline. The touchdown point is the point of which the pipeline contacts the seabed. In the past, ROVs have been employed for the purpose of determining this touchdown point. If the touchdown point is too close to the vessel, then there is a risk of buckling and/or overstressing. If the touchdown point is too far from the vessel, then there is a risk of the buckling of the pipe. As such, it is desirable to always ascertain the touchdown point of the pipe as the pipe laying operation continues.

ROVs have been employed for the purposes of determining this touchdown point. The ROV can utilize cameras in order to visually see the touchdown of the pipeline with the seabed. Unfortunately, the ROVs must be tethered to the vessel. In certain circumstances, the touchdown point may be nearly a mile from the vessel. As such, the length of the tether that is available may not be sufficient to cover such as distance. Under these circumstances, a second vessel, along with a second ROV, would be required. This significantly increases the expense of the pipe laying operation.

The efficiency of the pipe laying operation is largely determined by the efficiency with which the pipe can be welded end-to-end aboard the vessel. In the past, the pipes are welded in end-to-end relationship. Another section of pipe is placed over this welded joint and then welded to the pipe. This extra section of pipe can simply be placed over the pipeline in semi-cylindrical sections. These edges of the cylindrical sections are then welded together at the joint so that the pipe over lies the weld joint. This is a very time-consuming and inefficient operation.

Offshore hydrocarbon recovery operations are increasingly moving into deeper water and more remote locations. Often satellite welds are completed at the sea floor and are tied to remote platforms or other facilities through extended subsea pipelines. These pipelines extend through water that is thousands of feet deep, where temperatures of the water near the sea floor are in the range of 40° F. The hydrocarbon fluids, usually produced along with some water, reach the sea floor at much higher temperatures, characteristic of depths thousands of feet below the sea floor. When the hydrocarbons flow, any water present begin to cool, a phenomena that may significantly affect flow of the fluids through the pipelines. Some crude oils become very viscous or deposit paraffin when the temperature of the oil drops, making the oil practically not flowable. Hydrocarbon gas under pressure combines water at reduced temperatures so as to form a solid material, called a "hydrate". Hydrates can plug pipeline. These plugs are very difficult to remove.

Typically, so as to avoid the effect of such low temperatures, the pipeline can be surrounded by an insulating material, such as concrete, insulating foam or electrical heating pipes. Since the insulating material extends along the pipeline, the section of the insulating material must be removed from the pipe so that the welding operation can occur at the pipe joint. As such, there will be a space, adjacent to the weld, that is free of the insulating material. There is a need to be able to suitably cover this exposed area after the welding operation has been completed. In certain circumstances, in the past, an insulating material is placed over the space. The application of this insulation material, in the past, has been very time-consuming. It often takes a great deal of time for the insulating material, such as epoxy, to effectively cure in this space.

In the past, various patents have issued relating to the forming of field joints for a subsea pipelines and relating to the method of laying and positioning a subsea pipeline. For example U.S. Pat. No. 3,690,111 issued on Sep. 12, 1972 to J. F. Matthews, Jr., describes an offshore pipeline installation method. The underwater pipeline is installed by lowering it to the bottom of the water from the stern of a lay barge as the barge advances along a long preassembled pipeline section which floats near the surface of the water and is held in tension by a second vessel positioned in front of the lay barge. An additional floating section is connected in place when the lay barge reaches the end of the initial section. This additional section is held in tension by the second vessel. Laying of the line is continued as the lay barge advances.

U.S. Pat. No. 4,120,167, issued on Oct. 17, 1978 to Denman et al., teaches offshore pipe laying in which a forward movement of a pipe-laying vessel is controlled to maintain the position of the pipe as laid on the sea bed. The position of the touchdown point on the sea bed of the pipeline suspended from the vessel is measured at periodic intervals by driving a survey vessel fitted with an echo location device along the already laid line. The measured position of a touchdown point is compared with the desired track and any deviation is computed. Further movements of the pipe-laying vessel are adapted to minimize this deviation.

U.S. Pat. No. 4,124,991, issued on Nov. 14, 1978 to W. M. Adler, provides an offshore pipe laying method which employs a pipe laying vessel with a fixed stern ramp and includes repeated steps of launching pipe while allowing pipe tension to drop within safe limits. Fresh pipe sections are welded on during the forward movements of the vessel.

U.S. Pat. No. 4,226,444, issued on Oct. 7, 1980 T. W. Bunyan, discloses a method of joining pipes in which a sleeve is placed over the adjacent ends of the pipes so as to overlap each pipe. The sleeve fits with clearance around the pipe ends. The ends of the clearance space are closed by inflating hollow sealing rings and then epoxy resin is injected into the clearance space to fill the space. The pressure of the epoxy resin composition is then raised to a pressure substantially greater than atmospheric and the pressure is maintained until the resin composition is set.

U.S. Pat. No. 5,328,648, issued on Jul. 12, 1994 to McBrien et al., shows a method of using a composite joint infill system. A pair of concrete coated pipe joints are welded together end-to-end with a gap between the concrete coatings. The gap is filled with a fast setting elastomeric polymeric infill material, either solid or foamed, and a particulate filler material. A mold is used for molding the infill material. The mold is filled with filler material before the polymer components are injected.

U.S. Pat. No. 6,058,979, issued on May 9, 2000 to L. W. Watkins, shows a deep sea insulated pipeline that has an inner pipe which is encased lengthwise by an insulating core. The insulating core comprises macrospheres surrounded by syntactic foam that includes a semi-rigid resin binder and microspheres. The semi-rigid resin binder reinforces the macrospheres to provide sufficient strength to withstand the hydrostatic pressure at depths in excess of several thousand feet of water, and is yet flexible enough to accommodate bending associated with deep sea pipe laying operations. The deep sea insulated pipeline may also include a protective outer casing. The inner pipe extends through and cooperates with the outer casing to define an annulus chamber containing the insulating core.

U.S. Pat. No. 6,641,330, issued on Nov. 4, 2003 to Andersen et al., discloses a method and apparatus for laying elongated articles. Fiber-reinforced flexible adhesive tape is used to bind an elongate article or bundle of articles during subsea laying operations. The apparatus includes at least one carrier for a tape spool arranged to rotate while moving bodily around the axis of the article during laying.

U.S. Pat. No. 6,739,803, issued on May 25, 2004 to Bass et al., teaches a method of insulating an electrically-heated pipe-in-pipe subsea pipeline Inner and outer pipe segments are formed and the inner pipe is coated and insulated. The coating may include sprayed polyurethane foam and insulating half-shells that are placed around welds. Epoxy is preferably coated on the inner pipe before other coatings. The segments are loaded on a lay barge and water stops are preferably installed in the annulus as the pipeline is formed. Water stops may be formed by placing a liquid polymer in the annulus and allowing it to cure.

It is an object of the present invention to provide a method that facilitates the accurate determination of a touchdown point of the pipeline from a remote distance.

It is another object of the present invention to provide a method that avoid buckling and overstressing of the pipeline.

It is another object of the present invention to provide a method which minimizes the ROV requirements.

It is still another object of the present invention to provide a method which minimizes the time required for forming field joints.

It is still another object of the present invention to provide a method that enhances the ability to monitor pipes and pipe joints.

It is still a further object of the present invention to provide a method which improves the buoyancy of the pipeline at the joints.

It is still another object of the present invention to provide a method that improves the insulating quality at the joints.

These and other objects and advantages of the present invention will become apparent from a reading of the attached specification and appended claims.

BRIEF SUMMARY OF THE INVENTION

The present invention is a method of forming a field joint for a subsea pipeline. This method includes the steps of: (1) positioning an end of a first pipe adjacent to the end of a second pipe; (2) welding the end of the first pipe to an end of the second pipe; and (3) applying a coating material over the exterior surface of the first pipe and over the welding and over an exterior surface of the second pipe such that the second coating material is in sealing relationship therewith.

The coating material of the present invention is formed with air-filled glass spheres therein. The coating material is of an epoxy material.

The first pipe has an insulator material extending therearound and radially outwardly thereof a distance from the exterior surface of the pipe. This insulator material has an end spaced from the end of the first pipe. The second pipe has an insulator material extending therearound and radially outwardly of the exterior surface of the second pipe. This insulator material of the second pipe has an end spaced from an end of the second pipe. The coating material extends between the ends of the insulator material of the first and second pipes.

The method of the present invention further includes the step of wrapping a wrap material around the exterior surfaces of the first and second pipes at the ends thereof. This step of wrapping occurs prior to the step of applying the coating material. The wrap material is of a honeycomb configuration. The coating material is applied into spaces of this honeycomb material.

In the present invention, an RFID tag is applied adjacent to the ends of the first and second pipes. The RFID tag can be incorporated into the coating material or applied to the coating material.

The step of applying the coating material includes the steps of: (1) placing a mold around the exterior surface of the first pipe and over the welding and over the exterior surface of the second pipe; (2) injecting the coating material under pressure into the mold; and (3) curing the coating material such that the coating material is bonded to the exterior surfaces of the first and second pipes.

The present invention is also a method of laying and positioning a subsea pipeline that comprises the steps of: (1) forming a pipeline of a plurality of pipe sections joined together in end-to-end relationship such that a joint is formed between adjacent pipe sections; (2) discharging the plurality of pipe sections sequentially outwardly of a ship and into the water; (3) positioning an ROV in the water in an area adjacent to the pipeline; and (4) sending and receiving sonar signals toward and from the pipeline by the ROV so as to ascertain the touchdown point. The joint has coating material extending thereover. This coating material has air-filled glass spheres therein.

The step of sending and receiving the sonar signals includes directing the sonar signals towards the coating material at the joints of the plurality of pipe sections of the pipeline. The step of forming includes affixing an RFID tag onto or into the coating material at each of the joints. The ROV will have an RFID tag reader therein. An ROV can then fly along the pipeline so as to receive data from the RFID tags at the joints of the pipeline.

The step of forming includes positioning a mold over the adjacent pipe sections at the joint thereof, injecting an epoxy material having the glass spheres therein under pressure and into an interior of the mold and over the joint, and curing the epoxy material such that the coating material is in sealing relationship over the joint. A honeycomb material can be wrapped over an exterior surface of the pipe sections at the joint. The epoxy material is injected into the spaces within the honeycomb material.

DETAILED DESCRIPTION OF THE INVENTION

Figure 1:
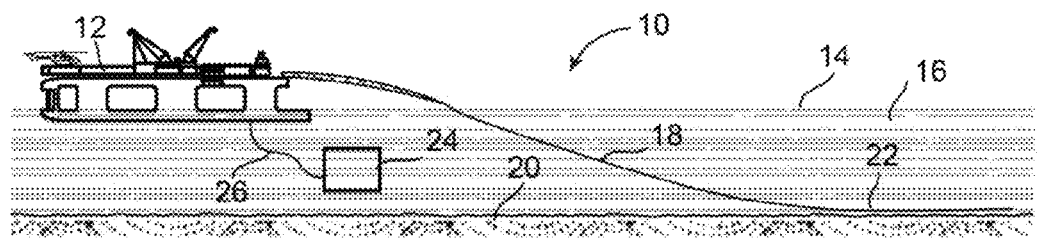
FIG. 1 is a diagrammic illustration of a prior art technique for laying of a subsea pipeline and for the determining of the touchdown point of the pipeline.

Referring to FIG. 1, there is shown a method of laying pipe in accordance with the prior art. As can be seen, there is a vessel 12 that moves along the surface 14 of the body of water 16. The pipeline 18 is laid such that the pipeline will reside against the floor 20 of the sea bed. The pipeline 18 extends in a generally S-shaped pattern from the vessel 12 downwardly so as to have a touchdown point 22 at the floor 20.

In FIG. 1, it can be seen the pipeline 18 will be assembled in an assembly-line fashion onboard the ship. In this manner, the various sections of pipeline are joined in end-to-end relationship by welding. Various types of insulating material can be applied over the exterior surface of the pipeline so as to provide the necessary insulation so as to protect the contents of the pipeline from the near-freezing temperatures at the floor 20 of the body of water 16.

In FIG. 1, it can be seen that there is an ROV 24 that is connected by a tether 26 to the vessel 12. The ROV 24 (illustrated in FIG. 1 in an exaggerated fashion) is configured so as to travel through the water 16 to a position adjacent the touchdown point 22. The ROV 24 can include suitable cameras so that an observer aboard the vessel 12 will be able to visually determine the touchdown point 22 and the determine the distance of the touchdown point from the vessel 12. As such, the operator of the vessel 12 will make the necessary calculation so as to avoid any buckling or overstressing of the pipeline 18.

Unfortunately, in conventional operations, the ROV 24 will need a suitable tether 26 having a length that allows the ROV 24 to move to a position adjacent to the touchdown point 22. In very deep water, this touchdown point may be as far as a mile from the vessel 12. Under these circumstances, it may be necessary for another vessel to move into position and launch an ROV so that a touchdown point can be determined. This is a very complicated and expensive procedure. As such, a need has developed whereby the touchdown point 22 can be determined in an efficient and effective manner with an ROV, such as ROV 24, from a location remote from a touchdown point.

Figure 2:
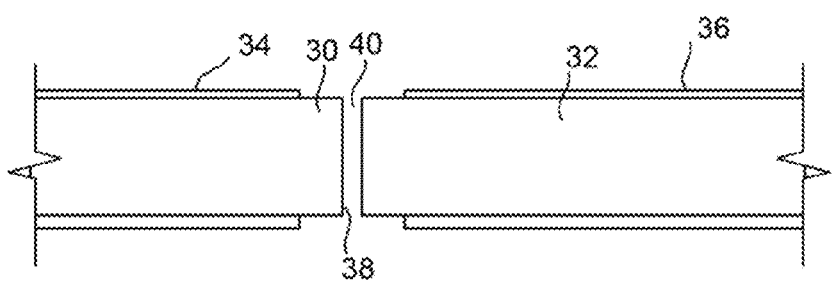
FIG. 2 is a cross-sectional view showing the ends of the pipe prior to welding.

FIG. 2 shows a prior art technique whereby a first pipe 30 is positioned so as to be welded to a second pipe 32. The first pipe 30 has an insulating material 34 extending thereover. Similarly, the second pipe 32 has an insulating material 36 extending thereover. The pipe 30 has an end 38 adjacent to an end 40 of the second pipe 32. It can be see that the insulating material 34 terminates a distance from the end 38 of pipe 30. Similarly, the insulating material 36 terminates a distance from the end 40 of the pipe 32. The insulating materials 34 and 36 are removed adjacent to the ends 38 and 40 so as to allow proper welding of the ends 38 and 40 to occur. As a result, the pipes 30 and 32 will be generally uninsulated in the space between the ends of the insulation 34 and 36 at the point of welding. In order to enhance the ability to insulate this space, various techniques have been employed in the past so as to cover this space (as described in the Background herein).

Figure 3:
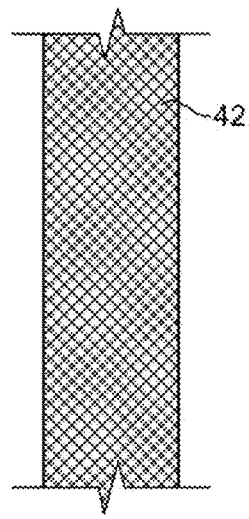
FIG. 3 is a plan view showing the honeycomb shape of the wrap material.

FIG. 3 illustrates a wrap 42 as used in the method of the present invention. The wrap material 42 has a width dimension and a length dimension. In particular, the wrap material 42 has a generally honeycomb configuration. The honeycomb material 42 should have a width suitable for extending between the ends of the insulation 34 and 36 of the pipes 30 and 32 and over the welding between the ends 38 and 40. The wrap 42 can be formed of any suitable polymeric material. Suitable clips, or other fasteners, can be applied to the wrap material 42 so as to facilitate the ability to fix the wrap material over the joint of the pipes 30 and 32.

Figure 4:
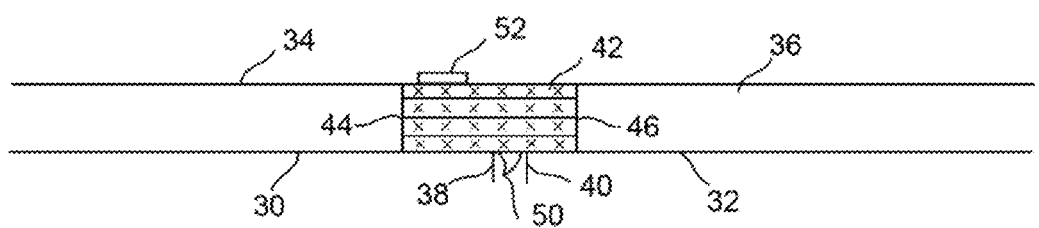
FIG. 4 shows the joining of the ends of the pipe together by welding and the application of the wrap material over the ends of the pipe.

FIG. 4 is a detailed view showing the placement of the wrap material 42 in the space between the ends 44 of the insulation 34 of pipe 30 and the end 46 of the insulating material 36 of pipe 32. Prior to the placement of the wrap material 42 into the space between ends 44 and 46, the respective ends 38 and 40 of the pipes 30 and 32 are fixed by weld 50. Weld 50 will extend circumferentially around the respective ends 38 and 40 of the pipes 30 and 32 so as to effectively secure the ends of the pipes together.

The wrap material 42 is then wrapped around the exposed ends of the pipes 30 and 32 and over the weld 50. It can be seen in FIG. 4 that several layers of the wrap material 42 are created by this wrapping process. Ultimately, the wrap material 42 is wrapped until the outer periphery of the wrap material resides adjacent to the outer surface of the insulation 34 and 36 of pipes 30 and 32. An RFID tag 52 can be affixed to the outer surface of the wrapped material 42 or, alternatively, can be placed within the wrap material 42, as desired.

Figure 5:
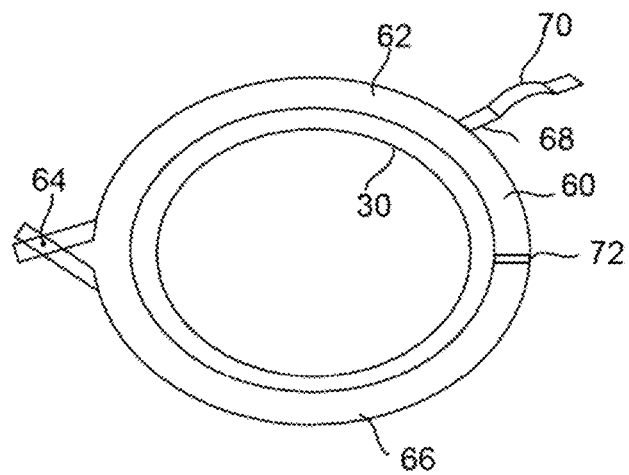
FIG. 5 is an end view showing the application of a mold over the joint in the pipeline.

FIG. 5 illustrates that a mold 60 is positioned over the pipes 30 and 32 in the area of the welding 40. The mold 60 has a clamshell construction. There is a first section 62 that is pivotally connected at 64 to a second section 66. An inlet nozzle 68 passes through the wall of the mold 60 so as to communicate with the interior of the mold 60. A hose 70 can then be used so as to deliver a coating material under pressure into the interior of the mold 60.

In this step of the process, the sections 62 and 64 are initially pivoted outwardly away from the pipe 30. The pipe 30 can then pass through the space 72 at the edges of the sections 62 and 66. Mold 60 can then have the sections 62 and 64 closed and locked together. The coating material can then be injected through hose 70 and through inlet 68 into the interior thereof. As such, the coating material can be effectively formed under pressure and under high temperatures in the space between the ends 44 and 46 of the respective insulations 34 and 36 of pipes 30 and 32. After injection, the sections 62 and 66 of the mold 60 can then be opened and moved to the next joint.

Figure 6:
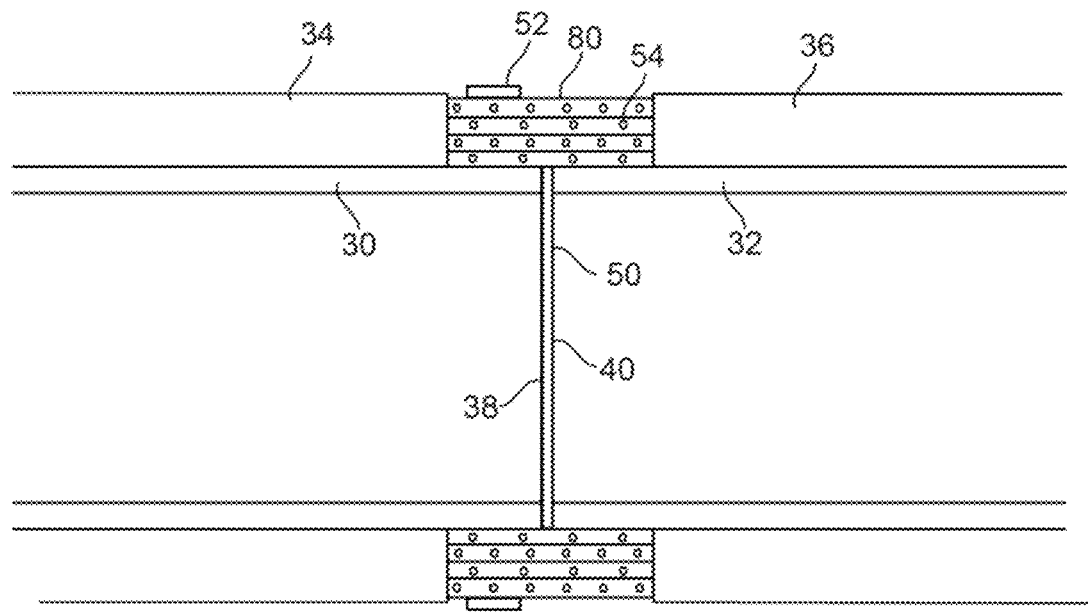
FIG. 6 is a cross-sectional view showing the application of the glass spheres and epoxy material into the wrap material at the joint.

FIG. 6 shows the injection of the coating material into the space between the insulations 34 and 36 of pipes 30 and 32. It can be seen that this coating material will fill the spaces of the honeycomb pattern of the wrap material 42. The coating can also cover the RFID tag 52, if desired. The coating material 54 will also extend over the weld 50 of the ends 38 and 40 of pipes 30 and 32.

Importantly, within the concept of the present invention, the coating material 54 is preferably an epoxy material. Significantly, the present invention contemplates the use of air-filled glass spheres that are mixed with the epoxy material prior to injection. As such, the epoxy material and the glass spheres will be injected and formed into the space between the insulations 34 and 36 of pipes 30 and 32.

The glass spheres 80 will fill a significant volume of the coating material 54. Since the glass spheres are filled with air, they will have increased buoyancy. The air within these glass spheres is a very good acoustic reflector. Additionally, the glass spheres have excellent insulation qualities. As such, the pipes 30 and 32 are effectively insulated by this construction at the area of the welding 50.

The RFID tag 52 can be incorporated in a variety of ways. The RFID tag 52 can be adhesively mounted to the coating material 54 on the exterior surface thereof. The RFID tag 52 can also be embedded into the coating material. The RFID tag 52 is embedded into the field joint and can contain information that is specific to the field joint. For example, the RFID tag can include information such as the date welded, the position of the RFID tag on the sea bed, the type and quality of the pipe, the type and quality of the weld, inspection information and vendor or supplier information. As such, the RFID tag 52 can provide an detailed record as to the assembly of the pipeline.

Figure 7:
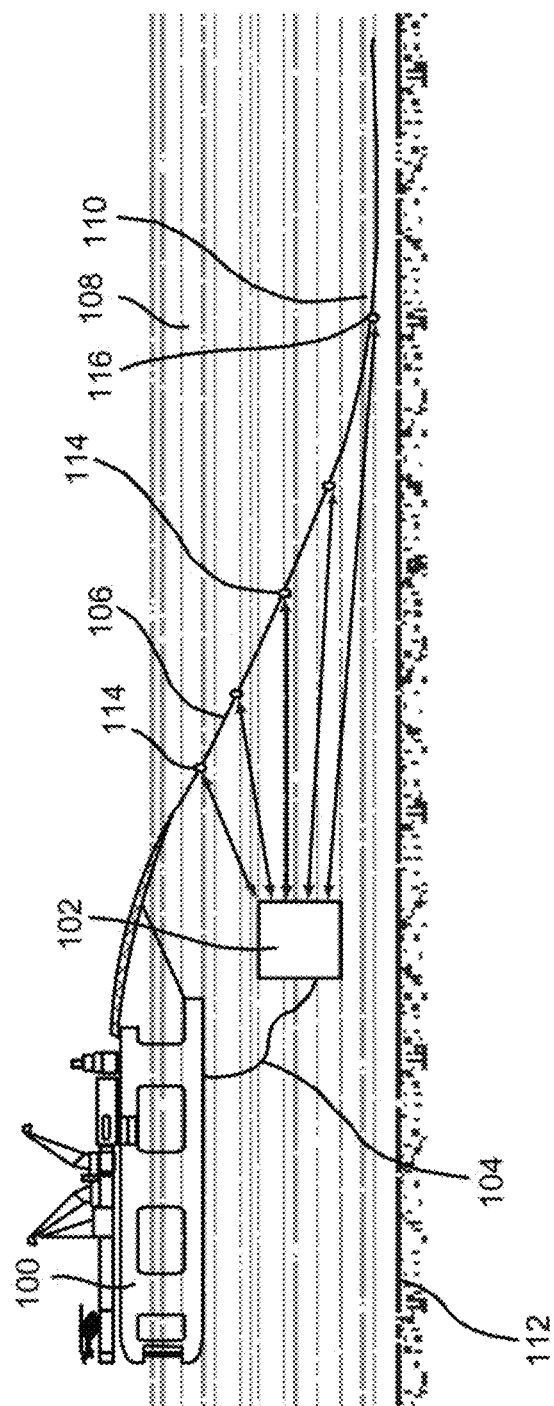
FIG. 7 is a diagrammatic illustration of the sonar reading of the location of the pipe joints.

FIG. 7 shows that there is a vessel 100 that has an ROV 102 connected by a tether 104 to the vessel 100. The pipeline 106 is illustrated as extending through the water 108 so as to have a touchdown point 110 at the floor 112 of the sea bed. The various joints 114 will occur along the pipeline 106 at regular intervals.

The ROV 102 is equipped with sonar equipment for sending and receiving sonar signals to and from the joints 114. Importantly, in the present invention, since the glass spheres are air-filled, they are an extremely good sonar reflector. With high-powered sonar equipment, the ROV 102 is able to effectively determine the position of the each of the joints 114 relative to the sea floor 112. Ultimately, the joint 116 at the touchdown point 110 can easily be determined, at a great distance, by the ROV 102. As a result, the present invention is able to avoid the additional vessels and/or ROVs that would be required in order to determine the touchdown point 106. The various locations of the joints 114 and 116 can be mathematically calculated so as to determine the shape and orientation of the pipeline 116 as it is laid upon the sea floor. As a result, by incorporating such air-filled glass spheres into the joints of the pipeline 106, the present invention is able to rely upon sonar to determine location, rather than visual observation. There is no need for the ROV to be in such close proximity to each of the joints in order to determine location. As such, the ROV 102 can be more efficiently and effectively used so as to lay and position the pipeline 106.

Since each of the joints 114 and 116 has an RFID tag thereon, the ROV 102 can be utilized so as to "fly by" each of these joints so as to receive information from each of the RFID tag. The RFID tag used communication through the use of the radio waves to exchange data between a reader on the ROV 102 and the tag for the purposes of identification and tracking. As such, through the use of these RFID tags, the ROV 102, along with the associated processing equipment on the vessel 100, is able to provide a complete record of the pipeline installation.

The process of the present invention greatly improves the time for completing the formation of the pipeline joints on the vessel 100. The injection molding of the coating material onto the joint has a cure time of approximately two minutes. As such, it is possible to establish this coating material in a quick and convenient manner. Welding operations, such as those that are used to place pipe segments over the joints, are effectively avoided. Additionally, the coating material, along with the glass beads therein, is flexible and very buoyant. As such, the ability to lower the pipe into the water 108 is enhanced.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A method of forming a field joint for a subsea pipeline, the method comprising:

positioning an end of a first pipe adjacent an end the second pipe;

welding said end of said first pipe to an end of said second pipe;

wrapping a honeycomb wrap material around said exterior surfaces of said first and second pipes at said ends thereof so as to extend over the weld, said honeycomb wrap material having open spaces therein, said open spaces opening to an outer surface and to an inner surface of said honeycomb wrap material; and applying a coating material over an exterior surface of said first pipe and over an exterior surface of said second pipe and over the weld through the open spaces of said honeycomb wrap material such that said coating material is in sealing relationship therewith, said coating material having glass spheres therein, said coating material applied into the open spaces of said honeycomb wrap material through the outer surface thereof.

2. The method of claim 1, said coating material being of an epoxy material, said glass spheres having air therein.

3. The method of claim 1, said first pipe having an insulator material extended therearound and radially outwardly a distance from said exterior surface, said insulator material having an end spaced from an end of said first pipe, said second pipe having an insulator material extending therearound and radially outwardly for a distance from said exterior surface of said second pipe, said insulator material of said pipe having an end spaced from an end of said second pipe, said coating material extending between said ends of said insulator material.

4. The method of claim 1, further comprising:
affixing a radio frequency identification tag adjacent to said ends of said first and second pipes.

5. The method of claim 1, said step of applying comprising:
placing a mold around said exterior surface of said first pipe and over said welding and over said exterior surface of said second pipe;
injecting said coating material under pressure into said mold; and
curing said coating material such that said coating material is bonded to said exterior surfaces of said first and second pipes.

6. A method of forming a field joint for a subsea pipeline, the method comprising:
positioning an end of a first pipe adjacent to an end of a second pipe;
welding said end of said first pipe to said end of the said second pipe;
wrapping a wrap material around said exterior surfaces of said first and second pipes at said ends thereof;
forming a coating material having air-filled glass spheres mixed therein; and
applying said coating material over an exterior surface of said first pipe and over said welding and over an exterior surface of said pipe such that said coating material is in sealing relationship therewith, said glass spheres embedded in said coating material, said step of wrapping being prior to said step of applying, said wrap material being of a honeycomb configuration, said honeycomb configuration having open spaces therein that open to an outer surface thereof, said coating material applied into the open spaces through the opening on the outer surface thereof.

7. The method of claim 6, the step of applying comprising:
placing a mold around said exterior surface of said first pipe and over said welding and over said exterior surface of said second pipe;
injecting said coating material under pressure into said mold; and
curing said coating material such that the coating material is bonded to said exterior surfaces of said first and second pipes.

8. The method of claim 6, further comprising:
affixing a radio frequency identification tag adjacent to said ends of said first and second pipes.

9. A method of laying and positioning a subsea pipeline comprising:
forming a pipeline of a plurality of pipe sections joined together in end-to-end relation, said plurality of pipe sections having a joint formed between adjacent pipe sections, said joint having a coating material extending thereover, said coating material having glass spheres therein, the step of forming further comprising:
wrapping a honeycomb material around said joint, said honeycomb material having open spaces therein, said open spaces opening to an outer surface of said honeycomb material; and
injecting said coating material into said open spaces of said honeycomb material through the openings at the outer surface thereof;
discharging said plurality of pipe sections sequentially outwardly of a ship and into the water, said pipeline having a portion defining a touchdown point on a subsea floor;
positioning a remotely-operated vehicle (ROV) in the water in an area adjacent to said pipeline; and
sending and receiving sonar signals toward and from said pipeline by said ROV so as to ascertain said touchdown point.

10. The method of claim 8, the steps of sending and receiving comprising:
directing said sonar signals towards said coating material at said joints of said plurality of pipe sections of said pipeline.

11. The method of claim 9, said step of forming further comprising:
affixing a radio frequency identification (RFID) tag onto or into said coating material at each of the joints, said ROV having an RFID tag reader thereon.

12. The method of claim 11, further comprising:
flying said ROV along said pipeline so as to receive data from the RFID tags at the joints of said pipeline.

13. The method of claim 9, the step of forming further comprising:
positioning a mold over the adjacent pipe sections at the joint thereof;
injecting an epoxy material having said glass spheres therein under pressure and into an interior of said mold and over said joint; and
curing said epoxy material such that said coating material is in sealing relationship over the joint.

* * * * *